March 13, 1934.  V. F. ZAHODIAKIN  1,950,911
INTERNAL COMBUSTION ENGINE
Filed July 28, 1932  6 Sheets-Sheet 5

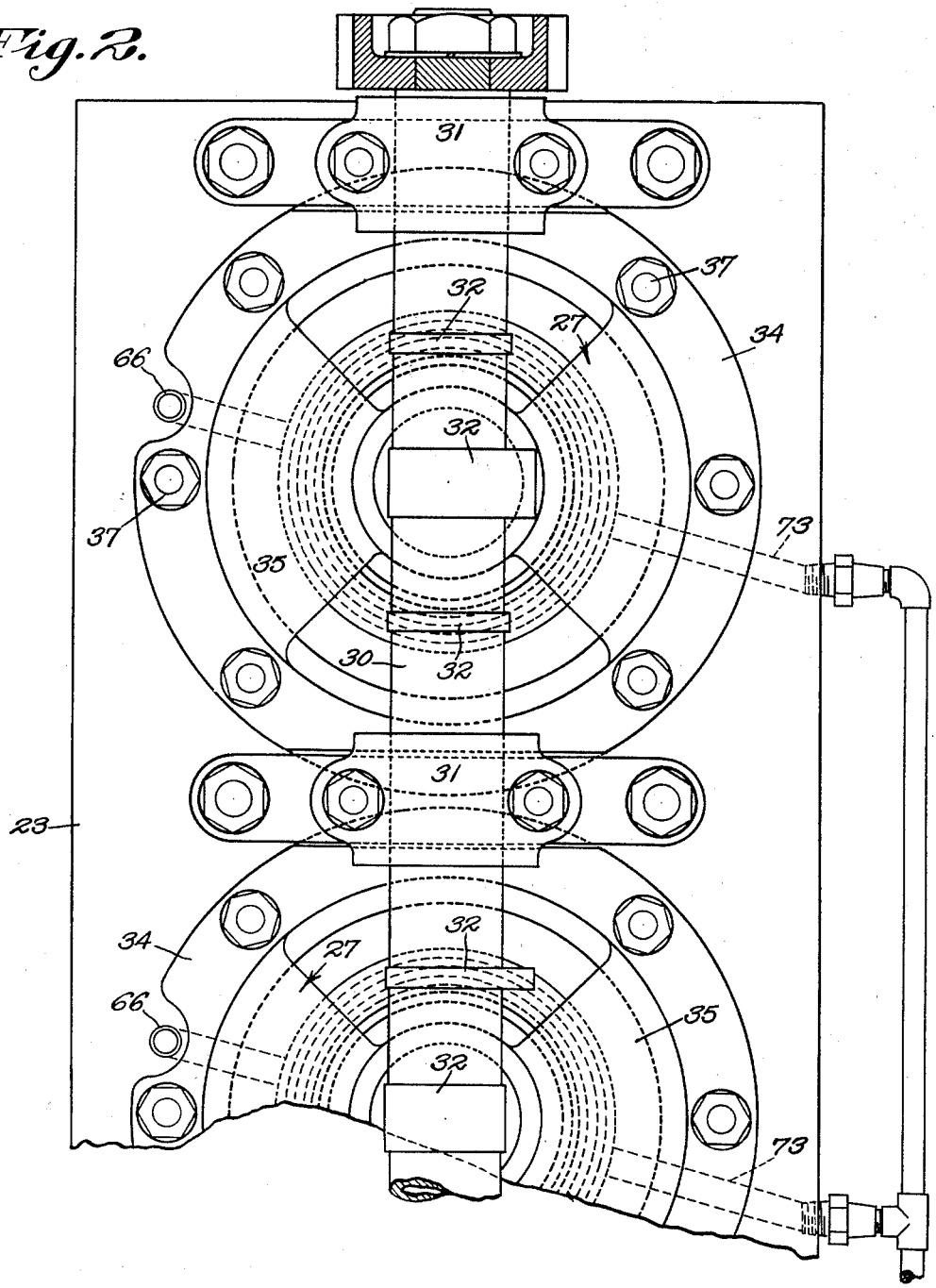

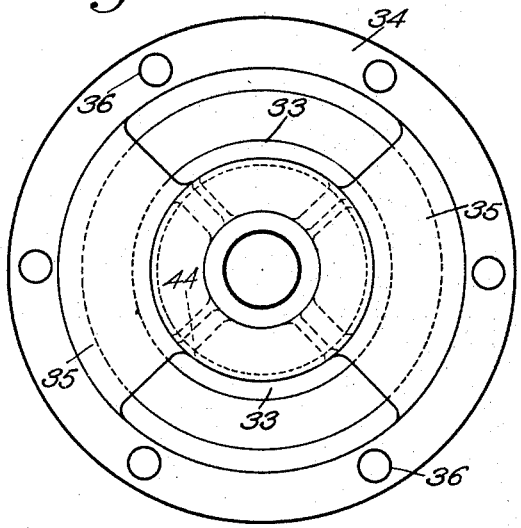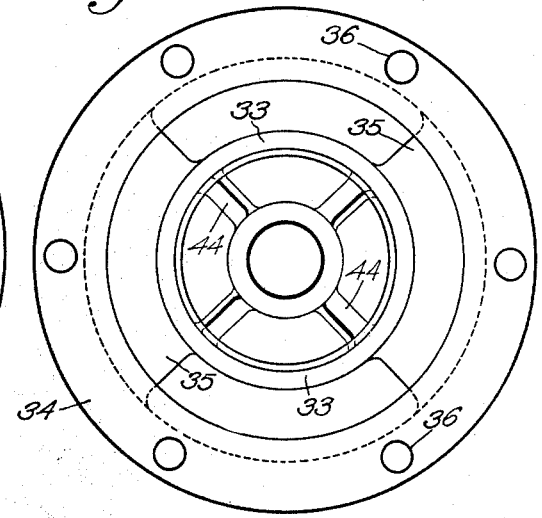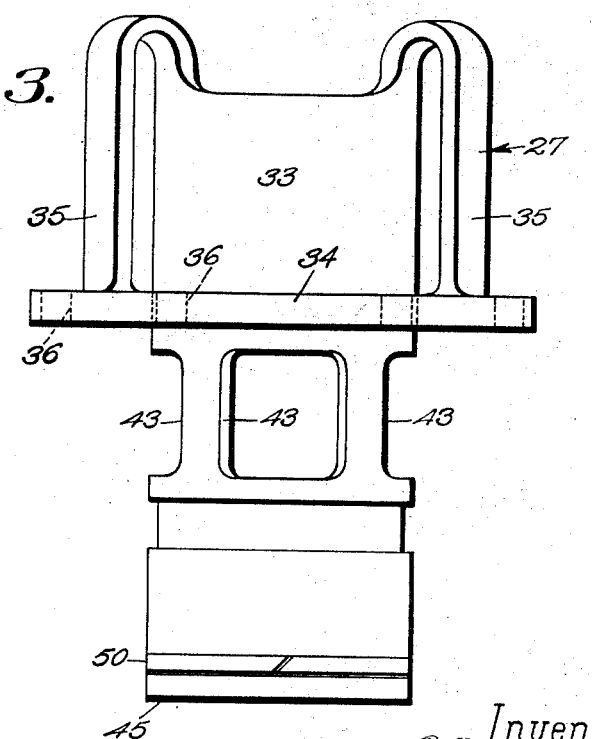

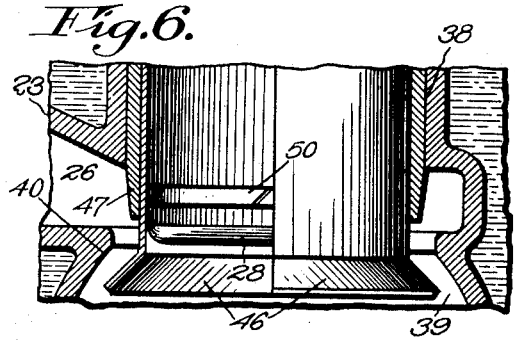
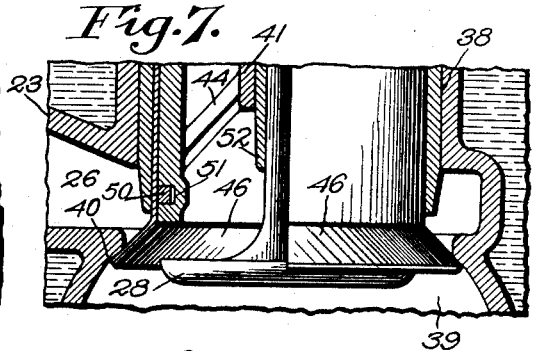
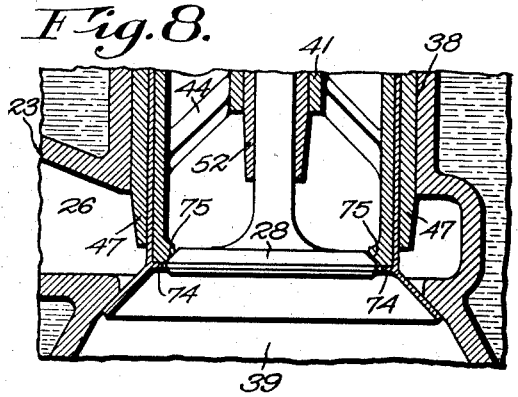
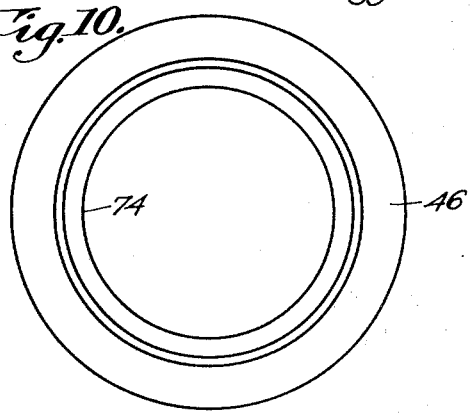
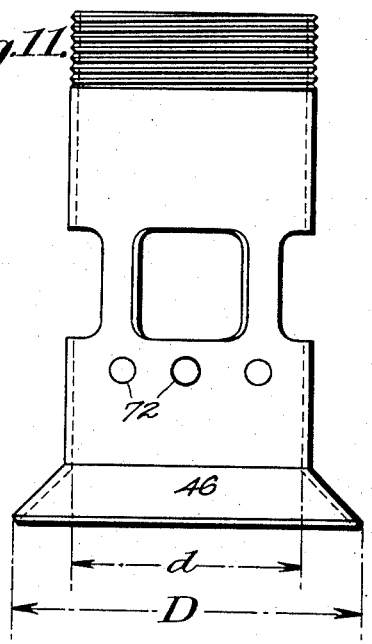
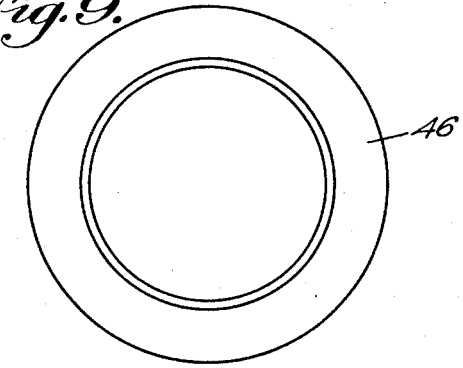

INVENTOR
Victor F. Zahodiakin
BY Wood & Wood
ATTORNEYS

March 13, 1934.                V. F. ZAHODIAKIN                    1,950,911
                            INTERNAL COMBUSTION ENGINE
                        Filed July 28, 1932          6 Sheets-Sheet 6

INVENTOR.
Victor F. Zahodiakin
BY
Wood & Wood
ATTORNEYS

Patented Mar. 13, 1934

1,950,911

UNITED STATES PATENT OFFICE 1,950,911

INTERNAL COMBUSTION ENGINE

Victor F. Zahodiakin, Cincinnati, Ohio

Application July 28, 1932, Serial No. 625,355

17 Claims. (Cl. 123—79)

This invention relates to improvements in internal combustion engines and is particularly directed to the construction of the valves thereof and their mounting and relation relative to the cylinder of the engine. The present structure is designed as an improvement on the structure disclosed in my co-pending application Serial No. 564,589, filed September 24, 1931.

It is the general object of this invention to obtain a more efficient engine operation by the provision of improved valves and valve mounting resulting in greater durability, speed and power, and particularly brought about by efficient cooling, more volumetric efficiency, additional scavaging effect and reduction in load on the working parts.

In the operation of internal combustion engines, it has been found that overheating of the valves, particularly the exhaust valve head, has resulted in considerable losses in engine efficiency. The overheating of the exhaust valve head causes flash or premature explosion of the incoming gas, these actions resulting in the so called "knock" or detonation causing vibration and damage to the engine. Moreover, this condition of overheating about the region of the valve head extends to the valve seat and causes burning or pitting of the same resulting in uneven seating surface and lack of power and compression in the cylinder due to leaks past the valve. Consequently, it is an object of this invention to prevent overheating of the valves, particularly the exhaust valve head.

During that phase in the cycle of movement of each piston when the exhaust valve is beginning to open for exhausting the products of combustion or hot gases from the cylinder, there is a considerable internal pressure occurring against the exhaust valve causing overworking and undue stress on the cam shaft or parts operating the valves. This amount of pressure, as is well known, is a matter of valve area exposed to internal pressure.

The internal area of the exhaust valve head is so arranged, particularly in relation to the inlet valve head, which in this type of valve structure is concentric and included within the confines of the exhaust valve, as to minimize resistance to opening and to thereby prevent pounding and overwork of the operating parts. It is provided that the inlet and exhaust valves are concentrically disposed presenting a substantially contiguous internal area within the combustion chamber, but the inlet valve is operated entirely independently of the exhaust valve and is held stationary while the exhaust valve is being opened. It is therefore another object of this invention to provide that the actual pressure on the exhaust valve resisting opening thereof is greatly reduced despite the provision of an exhaust valve head of great outside diameter. For this purpose a large portion of the area within the valve head exposed to the internal pressure is held stationary during opening of the exhaust valve and is not effective for causing pressure on the valve which would resist opening thereof. The large outside diameter permits the use of a large diameter outlet port and the discharge of the exhaust gases is more rapidly accomplished with less heating.

It is a further object of this invention to improve the valve lubrication by the proper delivery of lubricant, particularly to the exhaust valve.

It is a further object of this invention to provide that the inlet charge of fuel is directed toward the spark plug for reducing the spark plug temperature and also against the depending exhaust valve head uniformly around the entire circumference thereof with the result that a more perfect vaporization and constant low and uniform reduction of temperature of the exhaust valve head is brought about. This permits a lighter construction for the exhaust valve since the reduced temperature does not decrease the tensile strength of the part.

It is a further object of the present invention to provide an increased diameter for the inlet valve providing greater volumetric efficiency due to the introduction of fuel uniformly into the entire combustion chamber.

It is a further object to provide an improved exhaust valve in which the head thereof is capable of considerable variation as to its angular relation relative to the stem so as to cause definite pressure of inlet fuel contact therewith, and also in which the clearances are capable of variation, these features obtaining the proper valve head temperature and vaporization of fuel.

It is a further object of this invention to provide an improved valve mounting, removable guideways and inlet passageway arrangements as well as an arrangement of the seats for the valves, whereby the valves transmit the pressure load to fixed parts more efficiently and are entirely stabilized.

It is a further object to mount a sleeve-like exhaust valve in guideways disposed both internally and externally of the sleeve stem thereof, whereby there is no opportunity for disalignment of this valve and improper seating.

Other objects and further advantages will be more fully apparent from a description of the accompanying drawings, in which:

Figure 2 is a fragmentary top plan view of the engine embodying the present improvements.

Figure 3 is a side view of a valve support or mounting element removed from the engine.

Figure 4 is a top plan view of the element of Figure 3.

Figure 5 is a bottom view thereof.

Figure 6 is a fragmentary sectional view taken through the lower ends of the valves and showing the exhaust valve opened.

Figure 7 is a view taken similar to Figure 6, showing the inlet valve opened.

Figure 8 is a view taken similar to Figure 6 but illustrating a modified exhaust valve structure and showing both valves closed.

Figure 9 is a plan view of the exhaust valve of Figures 6 and 7.

Figure 10 is a plan view of the exhaust valve of Figure 8.

Figure 11 is a side view of the exhaust valve separated from the engine.

The present improvements are entirely concerned with the valve structure and consequently the description relates to the valve arrangement, structure and mounting, and particularly to that type of valve and valve arrangement which is designed to be mounted in the cylinder head of an internal combustion engine. Consequently the detailed description will be confined almost entirely to the cylinder head in view of the fact that the remainder of the parts are conventional.

Figure 1:
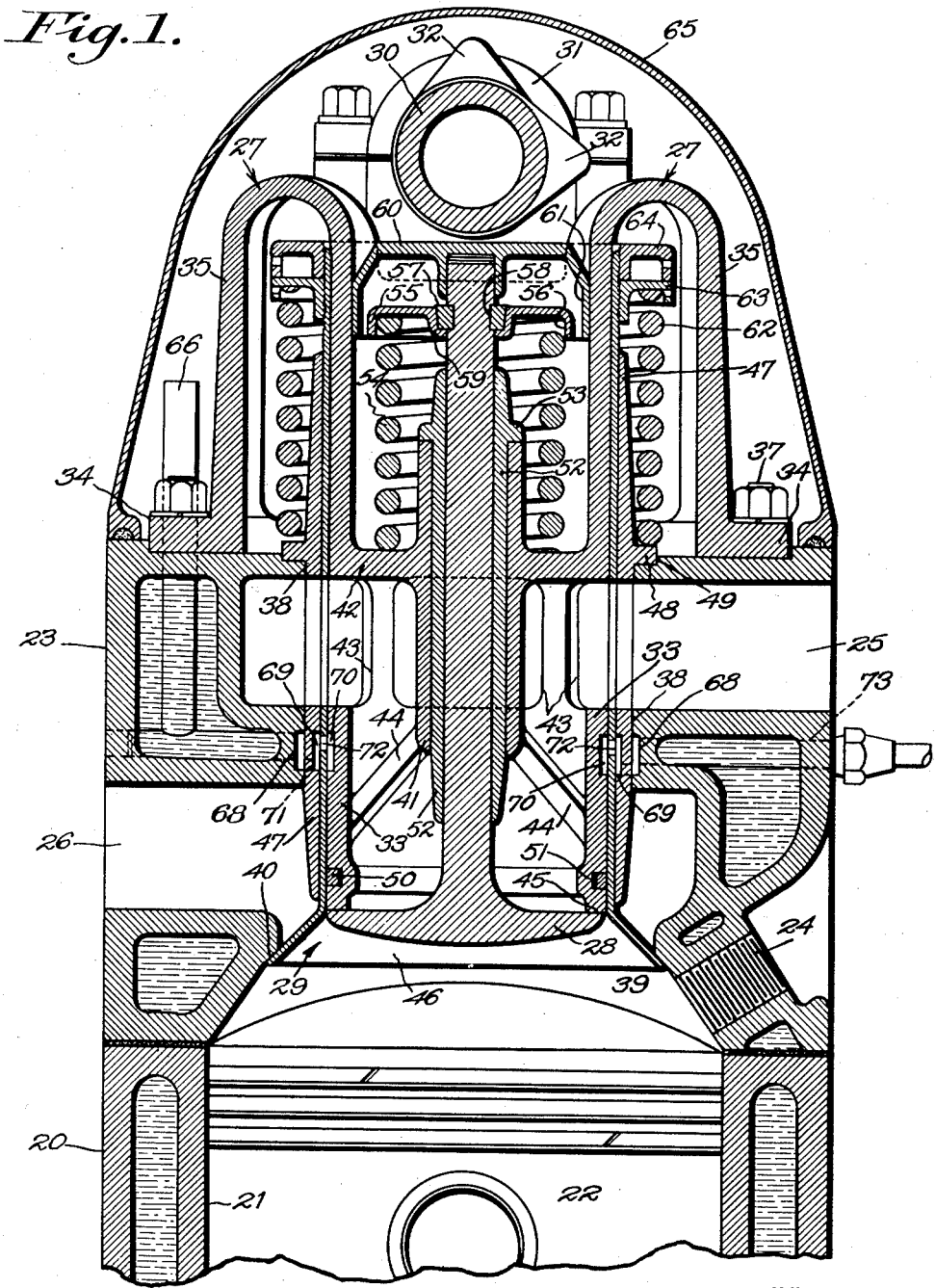
Figure 1 is a sectional view taken transversely through a cylinder of an internal combustion engine illustrating the improved valves and valve arrangement.
Figure 12:
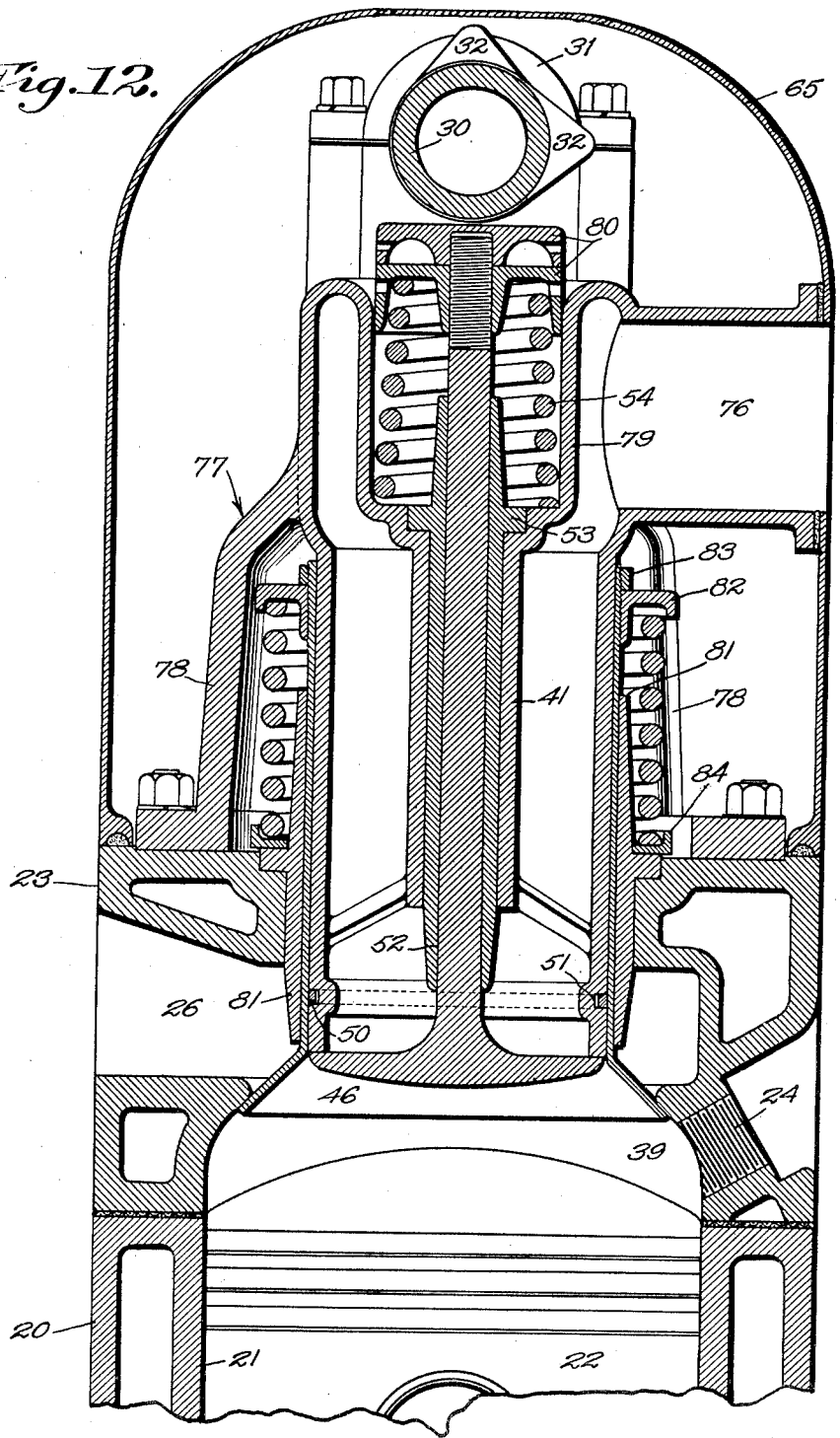
Figure 12 is a view taken similar to Figure 1 but showing a modified arrangement of the inlet passageway in the valve support or frame and structure of the valves.
Figure 14:
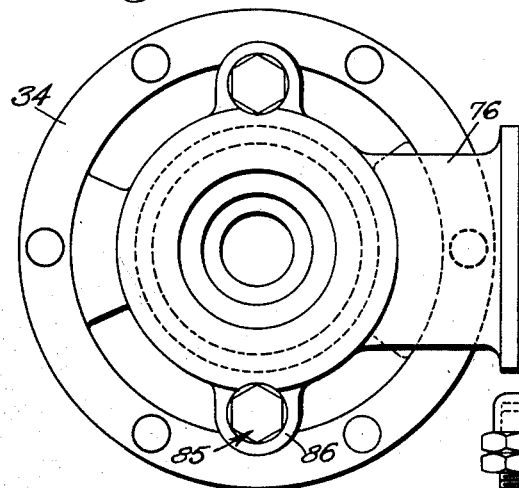
Figure 14 is a top plan view of the modified valve support.
Figure 15:
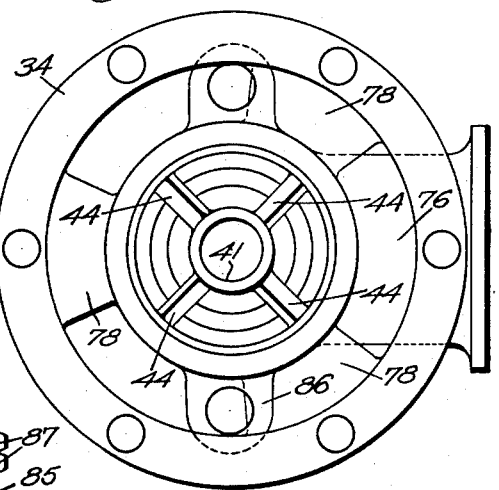
Figure 15 is a bottom view of the modified valve support.
Figure 13:
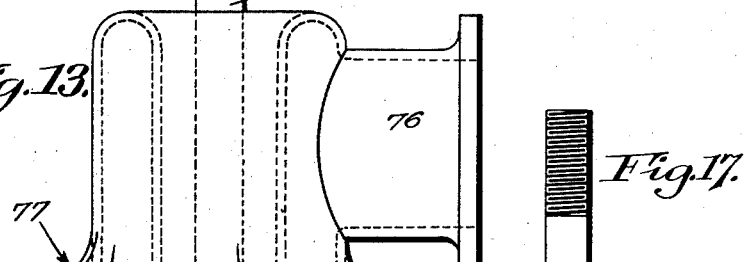
Figure 13 is a side view of the modified valve support or frame removed from the machine.
Figure 16:
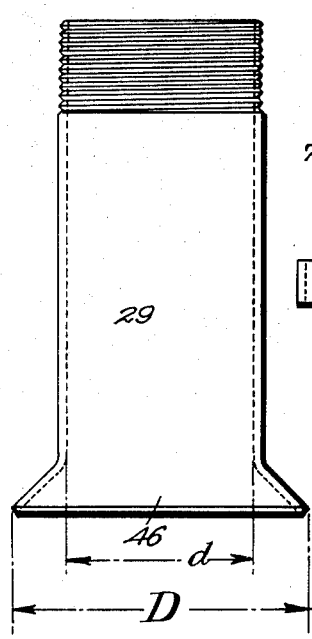
Figure 16 is a side view of the modified exhaust valve of Figure 12.
Figure 17:
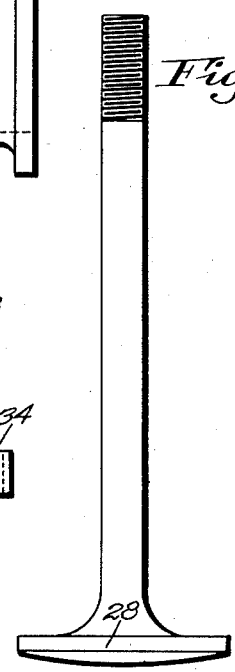
Figure 17 is a side view of the inlet valve of Figure 12.

For the purpose of illustrating the invention and its application to an internal combustion engine, the conventional cylinder block is shown at 20, one of the cylinders at 21 and a conventional piston at 22 (see Figures 1 and 12). The cylinder head, of particular design for the purpose of the present invention, is indicated generally at 23, a screw-threaded opening 24 for a spark plug extended into the combustion chamber being shown at the side of the cylinder head. The cylinder head as well as the motor block are of hollow design forming water jackets for the water cooling system conventionally used in conjunction with internal combustion engines.

As a part of the hollow structure of the cylinder head, inlet and exhaust passageways 25, 26 respectively are provided for each cylinder, the inlet entering to the combustion chamber from one side and the exhaust leading from the combustion chamber extended to the opposite side. A conventional gas intake manifold and an exhaust manifold (not shown) are attached to the respective opposite sides of the engine for connecting the inlet ports to the carburetor and the exhaust ports to the exhaust conduit.

A valve support or frame 27 of skeleton design is provided for each cylinder, this support mounting both an inlet valve 28 and an exhaust valve 29, in each instance, in concentric relation and in axial alignment with the cylinder. A cam shaft 30, which is power driven from a source not disclosed, is disposed lengthwise along the top of the cylinder head in end bearings 31 and includes cams 32 for operating the respective valves in a timed order as controlled by the conventional devices heretofore used as to timing.

The valve support or frame is illustrated in detail in Figure 3. It comprises a cylindrical portion 33 and a horizontally disposed circular flange 34 disposed medially of and spaced from the length of the cylindrical portion and attached thereto by downwardly extended webs 35 extended from the cylindrical portion. The depending flange 34 provides the means for attachment of the valve frame on the cylinder head through the medium of a series of circumferentially disposed apertures 36 traversed by bolts 37 extended into the cylinder head. The cylindrical portion of the valve frame or support depends through a concentric bore 38 in the cylinder head, which bore joins the exhaust passageway 26.

The cylinder head is cast to include a combustion chamber 39 of conical shape having its large diameter matching that of the cylinder and terminating at its upper end in a valve seat 40 in the entrance into the circular exhaust passageway axially aligned with the cylinder and the exhaust passageway, the circular exhaust passageway including a lateral continuation 26 to the side of the head. The depending cylindrical portion 33 of the valve support extends to a point just above the exhaust valve seat 40, leaving a wide clearance space between the lower end thereof and the wall of the exhaust opening but providing a rigid valve supporting wall and partition extended into the exhaust passageway.

The valve frame is provided with an internal sleeve 41 providing a slidable mounting for the inlet valve and joined to the cylindrical body by a horizontally disposed wall 42. The bottom of this internal wall 42 is flush with the ceiling or upper surface of the gas inlet passageway 25 which extends circumferentially around the cylindrical body of the valve support. A plurality of radially disposed apertures 43 are provided in the cylindrical body portion of the same height as the inlet passageway and connecting the same to the interior of the cylindrical portion below the internal wall 42.

A series of radially disposed supporting ribs 44 join the lower end of the internal sleeve 41 to the cylindrical wall of the valve support and further strengthen the skeleton structure of this element. These ribs 44 are disposed obliquely to present a series of vanes to the incoming charge for imparting a centrifugal force or whirling action to the charge as it comes into the combustion chamber.

Consequently, the radial openings 43 and gas inlet passageway continues generally through the cylindrical portion and thence into the cylinder or combustion chamber. The heads of the inlet or exhaust valves are adjacently disposed, the inlet valve head seating against the lower end 45 of the cylindrical body of the valve support in a horizontal plane and the head of the exhaust valve being in the form of an angularly disposed apron portion 46 adapted to contact the exhaust passageway seat previously described.

The exhaust valve is in the form of a sleeve and has a flared lower end serving as the seating or head end thereof. This valve is telescopically mounted on the cylindrical body portion of the valve support and is adapted for vertical reciprocation thereon. It is further guided by means of a guideway 47 in the form of a sleeve disposed snugly thereabout and fixed within the bore in the cylinder head traversed by the cylindrical body portion and including an intermediate flange 48 lying in a circularly recessed portion 49 of the head. Consequently the exhaust valve is guided between the valve support and the guideway and is firmly held against lateral play or disalignment. The guideway 47 extends substantially from the top to the bottom of the valve element with the exception of clearance at the ends for reciprocation.

A metal sealing ring 50 of split design similar to a piston ring is mounted in a circumferential groove 51 in the outer periphery of the cylindrical body portion of the valve element and bears against the exhaust valve inner bore for preventing compression losses such as might occur upwardly from the combustion chamber between the valve stem and its inner support.

The inlet valve is mounted in a guideway 52, supported in the internal sleeve of the valve support and includes a supporting flange 53 lying against the top end of the hub. This valve is maintained in seated position by means of a coil spring 54 under compression about the hub portion and between the horizontal wall and a retaining disc 55 fixed to the end of the valve stem and including a flange 56. A split ring 57 is disposed within an annular groove 58 in the stem of the valve and the retaining washer includes an underlying flange 59 disposed under this ring 57 for preventing upward movement of the retaining washer.

For guidance of the upper end of the inlet valve and actuation of the valve, a second disc 60 is screw-threaded on the extreme upper end of the stem and has an outer flange 61 having a sliding fit in the internal bore of the cylindrical body portion of the valve element. The plane top of this latter element is engaged by the inlet valve actuating cam 32.

The exhaust valve is also maintained in seated position by means of a coil spring 62 under compression, disposed about the cylindrical body portion of the valve element and between the supporting flange of the outer guideway and a washer 63 screw-threaded on the upper end of the exhaust valve stem. A duplicate 64 of this washer is screw-threaded on the valve stem for locking the lower washer in position and providing a contact element for actuation of the exhaust valve by means of duplicate cams 32, one at each side of the inlet actuation cam, these latter cams acting through a clearance between the supporting webs or flanges of the valve support.

The entire upper structure is encased in a valve cover 65 fixed to the cylinder head and including a sealing or packing gasket around its abutting edge. For the purpose of using a certain amount of the oil mist in the encased region above the valves, a suction pipe 66 extends downwardly from this region through the head and is connected by a pipe 67 to one side of a circumferential groove 68 formed in the bore of the head containing the valve structures.

Adjacent this groove 68 there are similar grooves, 69, 70, the first in the internal bore of the outer guideway and the second in the outer periphery of the cylindrical portion of the valve element. A series of radial openings 71 are provided in the outer guideway connecting the lower ends of the adjacent grooves 68, 69 and a series of apertures or ports 72 are provided in the exhaust valve sleeve stem at the upper portion of the adjacent grooves 69, 70. A suction pipe 73 extends to the carburetor or some other suction means from the opposite side of the outermost groove 68 and consequently the oil laden mist is drawn through all these grooves and deposited on the sliding surfaces of the exhaust valve.

If it is desired to seal the exhaust valve mounting at the lower end in lieu of the split ring, an internal lip 74 may be provided thereon as shown in Figure 8, this lip engaging the lowermost end of the valve support. In this case the seat 75 for the inlet valve may be tapered and formed about the lower opening of the inlet passageway, or strictly speaking, in the internal bore of the cylindrical body of the valve support.

In Figures 12 to 17, a modified mounting for the valves is disclosed. In this modification the arrangement of the operative ends of the valves or the heads thereof is the same as in the previously described form. Moreover, the guidance and the mounting for the exhaust valve is substantially the same as in the previously described form. In this instance the cylinder head is greatly reduced in height in that the inlet passageway is brought in through the valve support element entirely.

The upper end of the cylindrical portion of the valve element is closed and a laterally extended snout 76 is provided independently of the cylinder head and spaced above the same. A valve support 77 is attached in about the same manner as in the preceding form, the depending support legs 78 thereof being extended downwardly from the sides of the cylindrical portion rather than from the top end. In this instance the inlet valve is guided in the same manner as in the preceding form but the control or seating spring 54 therefor is contained within an internal sleeve portion 79 at the upper end of the sleeve 41 formed as a continuation of the outer wall of the cylindrical or main body portion.

A pair of retaining nuts 80 maintain the spring 54 under compression in this housing against the base thereof, these elements being screw-threaded on the upper end of the valve stem and the actuation of the valve taking place as in the preceding form. In the instance of the exhaust valve due to the fact that the valve sleeve stem 81 is considerably shortened and terminates below the snout 76, it is necessary to provide actuating mediums between the duplicate cam elements 32, 32 and an actuating collar 82 screw-threaded on the upper end of the valve sleeve stem, which serves as the valve spring retainer and is held in position by a lock nut 83, the lower end of the spring being seated in a cup-shaped washer 84. These actuating mediums are in the form of slidably mounted studs or plungers 85 disposed in lugs 86 at each side of the valve support and engaging the actuating collar 82 of the exhaust valve.

The upper ends of these plungers 85, each carry a pair of nuts 87, the lower being a lock nut and the upper including a closure cap providing a plane top surface for engagement by the cam 32, these nuts being adjustably mounted on the plungers 85. Except for the re-arrangement of the inlet passageway, the exhaust valve actuating means and the spring means for the inlet valve, the modified form is similar to the form previously described.

As the inlet valve is opened during the down stroke of the piston and the new charge of gas is drawn into the cylinder and combustion chamber, this charge is given a whirling action or centrifugal movement by coming in contact with the ribs 44 connecting the sleeve 41 to the body of the valve support since these ribs are disposed after the manner of vanes. This rotary or whirling action increases the speed of the incoming charge and the result is that it strikes the exhaust valve head at a greater pressure resulting in more efficient cooling of the exhaust valve and spark plug and a more complete vaporization of the liquid fuel.

It is brought out at this point that the angle of the valve head or valve skirt is carefully selected to provide for a predetermined temperature of the exhaust valve head and of the incoming gas charge. The rise in temperature of the incoming gas charge is largely a question of contact with the exhaust valve head and the more direct this contact the greater will be the temperature induced. The cooling of the exhaust valve head is governed by its angular relation, it being apparent that if there is less direct contact there will be less tendency to cool the valve head skirt or head.

Cooling of the valve head, occuring not only because of the uniform entry of the inlet blast and its proper direction against the head but because of appropriate clearances between the inlet valve head circumference and the exhaust valve head as well as between the exhaust valve head and its seat, results in cooling of the valve seat as well and prevents pitting or burning of the seat and a true seating surface is maintained, whereby compression losses are materially reduced. Because of the uniform delivery of the charge to the cylinder, greater volumetric efficiency results and it is possible to increase the speed of the engine. Reduction in exhaust valve head temperature eliminates pre-ignition and its attendant damages as previously set forth. More perfect vaporization occurs because of the fact, that the incoming charge is delivered uniformly around the circumference of a large diameter exhaust valve head.

The improvement accomplished by the described valve arrangement will be apparent from the formula (see Figures 11 and 16), $$(.7854 \times D^2 - .7854 \times d^2) P$$

wherein $.7854 \times D^2$ is the total area of the exhaust valve head and included areas and $.7854 \times d^2$ is the area of the internal diameter of the exhaust valve head area proper and this latter area must be subtracted from the total area disposed to pressure for determining the pressure against which the exhaust valve head proper is moved. This is true since, during the opening of the exhaust valve, this last mentioned area namely $.7854 \times d^2$ does not move against the internal pressure. It is of great advantage to employ an exhaust valve of great outside diameter with reduced pressure resistance to opening since the outlet port is then of large diameter and rapid exhaust may take place with less heat.

The improved valve structure and arrangement may be applied to other types of engines such as the L-head, T-head and other types as well as to air cooled engines, and the purpose of this application is to include these intended uses.

Having described my invention, I claim:

1. In an internal combustion engine, an engine body including a cylinder block and head therefor, a piston in the cylinder of said block, a valve support disposed in the head, said engine body including an inlet passageway, said passageway extending to the cylinder through the interior of the valve support, said head including an exhaust passageway extended from the top of the cylinder concentric with the support and around the same, said support depending to a point adjacent the top of the cylinder, the lower end thereof forming a valve seat, said engine body including a valve seat, inlet and exhaust valves slidably mounted on the support and contacting the respective seats, said valves having their heads substantially contiguous and the head of the exhaust valve being flared outwardly and downwardly, and means for operating said valves independently, whereby the exhaust valve is opened without moving the inlet valve and encounters reduced resistance to opening due to reduced area.

2. In an internal combustion engine, an engine body including a cylinder block and head, a piston in the cylinder of said block, said engine body including an outlet passageway therefrom, a stationary one-piece valve support and pressure receiving element mounted on the engine body and having a cylindrical body portion forming an inlet passageway extending to the cylinder from above the head thereof and across the exhaust passageway, an exhaust valve of cylindrical form telescopically reciprocal upon said cylindrical body portion, a guideway mounted in the engine body and surrounding said cylindrical exhaust valve, said exhaust valve including a head controlling the exhaust passageway, an internal sleeve formed in said valve support including a valve guide therein, an inlet valve slidably supported in said guide and having its head adapted to seat on the lower end of the cylindrical body portion, and means for actuating said valves.

3. In an internal combustion engine, an engine body including a cylinder block and head, a piston in the cylinder of said block, said body including inlet and exhaust passageways entering the cylinder, a valve support having a portion dividing said passageways, inlet and exhaust valves slidably supported on said valve support for controlling said passageways respectively, said exhaust valve telescopically disposed about the passageway dividing portion of the valve support, said inlet valve mounted for reciprocation within said portion, said valve support including attaching feet, said feet disposed for clearing the upper ends of the stems of the respective valves, cams for actuating said valves from above, and contact elements fixed to the upper ends of the valve stems for engagement by the cams.

4. In an internal combustion engine, an engine body including a cylinder block and head, a piston in the cylinder of said block, a stationary valve support element mounted on the head including a depending cylindrical portion extended to the top of the cylinder, said engine body having an inlet passageway entering the interior of said valve support, an exhaust passageway disposed about said valve support, valves for controlling the respective passageways, the inlet valve adapted to seat on the lower end of said cylindrical portion, said cylindrical portion including a horizontal wall providing a top closure for the inlet passageway, contact and spring retaining elements secured on the upper end of the inlet valve stem, a spring disposed under compression between said elements and the horizontal wall, and means for actuating said valve through said contact and retaining elements.

5. In an internal combustion engine, an engine body including a cylinder block and head, a piston in the cylinder of said block, a valve supporting pressure receiving guide mounted on said engine body and including a depending cylindrical portion extended substantially to the top of the cylinder, said head including an inlet passageway entering the cylinder through the interior of said cylindrical portion, and an exhaust passageway extending from the cylinder around said cylindrical portion, a tubular exhaust valve telescopically supported about said cylindrical portion and including a head, a seat formed in the cylinder head contacted by said exhaust valve head, a conical seat formed at the lower end of the bore of the cylindrical portion, an inlet valve having its head adapted to contact said conical seat, said exhaust valve including a horizontally disposed internal lip contacting the lower end of the cylindrical portion for further sealing the exhaust valve internal slidable mounting to prevent loss of compression.

6. In an internal combustion engine, an engine body including a cylinder block and head, a piston in the cylinder of said block, said engine body including an inlet passageway to the cylinder and an exhaust passageway therefrom, vertically reciprocating valves for controlling said passageways, means for operating said valves, circular grooves in the head adjacently disposed at opposite sides of said exhaust valve stem at an intermediate point thereof, said exhaust valve including ports connecting said circular grooves, a cover over said means and the upper ends of the valves, a pipe extended from the interior of said cover to the outer of said circular passageways at one side of the same, a suction pipe extending from the opposite side of said circular passageway, whereby the oil mist within the cover is drawn into the circular passageways for lubricating the exhaust valve stem.

7. In an internal combustion engine, an engine body including a cylinder block and a cylinder head, a piston in the cylinder of said block, a valve support mounted on the head and having a depending cylindrical portion, said engine body having an inlet passageway entering said cylinder through said cylindrical portion and an exhaust passageway extending from said cylinder around the lower end of said cylindrical portion, valves for controlling the respective passageways, the exhaust valve head being constituted by a flared end of the valve, and a series of radially obliquely disposed vanes in said cylindrical portion for imparting a centrifugal or whirling action to the incoming charge as it is drawn into the cylinder and delivers the charge forcibly against the angular exhaust valve head for cooling the head.

8. In an internal combustion engine, an engine body including a cylinder block and a head, a piston in the cylinder of said block, said engine body including an inlet passageway extended to the cylinder and an exhaust passageway extended from the cylinder, said passageways co-axially entering the top of the cylinder, inlet and exhaust valves for controlling said passageways disposed co-axially therewith, the inlet valve being disposed within the exhaust valve, a seat element for said inlet valve disposed adjacent the exhaust valve head, the engine body including a seat for the exhaust valve head, and said exhaust valve being of sleeve form including a downwardly extended angular skirt forming the head thereof, whereby the inlet charge in passing the inlet valve and seat is directed outwardly against the angular portion of the exhaust valve for cooling the same and controlling the temperature of the inlet charge.

9. In an internal combustion engine, an engine body including a cylinder block and a head, a piston in the cylinder of said block, said engine body including an inlet passageway to said cylinder and an outlet passageway therefrom, a one-piece valve support and pressure receiving element mounted in the head and having a cylindrical body portion co-axially disposed relative to the cylinder, providing a partial wall between the inlet and exhaust passageways, an exhaust control valve of cylindrical form mounted for reciprocation telescopically upon said cylindrical body portion, a guideway mounted in the cylinder head and surrounding said cylindrical exhaust valve, an inlet control valve slidably supported in said valve support and pressure receiving element, and means for actuating said valves.

10. In an internal combustion engine, an engine body including a cylinder block and a head, a piston in the cylinder of said block, a valve support element mounted on the head including a depending cylindrical portion extended to the top of the cylinder, said engine body having an inlet passageway entering the cylinder through the interior of said valve support above the cylinder head, an exhaust passageway extended to the cylinder about said valve support, valves for controlling the respective passageways, and means for actuating said valves.

11. In an internal combustion engine, an engine body including a cylinder block and a head, a piston in the cylinder of said block, said engine body including an inlet passageway to the cylinder and an exhaust passageway therefrom, reciprocating independent valves for controlling said passageways, circular connected passageways in the head adjacently disposed around said exhaust valve stem at either side and at an intermediate point thereof, means for operating said valves, a cover over said means and the upper ends of the valves, a pipe extended from the interior of said cover to one side of said circular passageways, a suction pipe extending from the opposite side of said circular passageways, whereby the oil mist within the cover is drawn into the circular passageways for lubricating the exhaust valve stem.

12. In an internal combustion engine, an engine body including a cylinder block and head, a piston in the cylinder of said block, a valve support of cylindrical form, said engine body having an inlet passageway entering said cylinder through said valve support and an exhaust passageway extending from the cylinder about said valve support, concentric valve seats formed at the lower end of the valve support and at the top of the cylinder respectively, and valves for controlling the respective passageways, said valves disposed co-axially upon and in said valve support for co-operation with said seats.

13. In an internal combustion engine, comprising, a cylinder block including cylinders each having an inturned upper periphery constituting an annular exhaust valve seat, and pistons in said cylinders, a superposed inlet and outlet valve supporting structure, which together with the respective valves constitutes a cylinder closure, a central inlet valve chamber, a poppet valve seating against the under-surface of the valve chamber positioned above the plane of the cylinder top, a reciprocating sleeve valve having a slide bearing upon the outer peripheral wall of the inlet chamber and an annular exterior flange projecting interiorly of the cylinder to contact with said annular exhaust valve seat.

14. In an internal combustion engine, a cylinder block and a cylinder formed with an inturned peripheral exhaust valve seat and a piston operating therein, a superposed structure supporting independently acting inlet and exhaust valves, said structure constituting a cylinder closure and an inlet valve chamber, a poppet valve seating against the under-surface of the valve chamber, a sleeve valve having a slide bearing on the inlet chamber wall, said sleeve having a radially flared portion disposed across an annular space between the inlet and outlet valve seats and having a straight inner surface at an angle relative to the inlet valve seat, whereby the entire interior surface of said flanged portion of the exhaust valve is directly exposed to the velocity and temperature of the incoming charge of gas.

15. In an internal combustion engine, a cylinder formed with a peripheral inturned exhaust valve seat, a superposed supporting unit forming a central inlet valve chamber, a poppet valve seating against the under-surface of said chamber, the said inlet and outlet valve seats being vertically spaced, an independently acting exhaust sleeve valve formed with a radially flared depending member seating only against the exhaust valve seat formed by the inner periphery of the cylinder, the said flared portion of the sleeve valve annularly spanning the space between the fixed valve seats, the inner surface thereof being directly exposed to the velocity and temperature of the incoming charge of gas.

16. In an internal combustion engine, a cylinder formed with an inturned peripheral exhaust valve seat, a poppet type inlet valve, an inlet chamber containing said inlet valve, a sleeve type exhaust valve, the said inlet and outlet valves coacting in relation to seats formed by the inlet chamber and by the inturned periphery of the cylinder, the said valve seats being disposed in vertically spaced relationship, the said exhaust sleeve valve terminating in a radially flared hood spanning the annular space between the fixed valve seats in position for directing the incoming charge into the cylinder.

17. In an internal combustion engine, a cylinder formed with an internal peripheral flange constituting an exhaust valve seat, a superposed inlet and exhaust valve supporting element, including a central inlet chamber, a poppet valve seating on the under-surface of said chamber in a plane above the top of the cylinder, a concentric sleeve valve having a bearing on the wall of said inlet chamber, said chamber providing a concentric external bearing for said sleeve, said sleeve terminating within the upper end of the cylinder in a funnel-shaped member which spans the annular space between the fixed valve seats for directing an incoming charge of gas into the cylinder, the reciprocating inlet and outlet valve members respectively seating only respectively against the valve seats constituted by the under-surface of the inlet chamber and by the inturned periphery of the cylinder.

VICTOR F. ZAHODIAKIN.